United States Patent
Won et al.

(10) Patent No.: US 9,645,427 B2
(45) Date of Patent: May 9, 2017

(54) LIQUID CRYSTAL DISPLAY COMPRISING A PLURALITY OF MICROCAVITIES FILLED WITH LIQUID CRYSTAL MOLECULES AND A LIGHT BLOCKING LAYER THAT FILLS A CONTACT HOLE

(71) Applicant: Samsung Display Co., Ltd., Yongin, Gyeonggi-Do (KR)

(72) Inventors: Sung Hwan Won, Suwon-si (KR); Yong Seok Kim, Seoul (KR); Tae Woo Lim, Hwaseong-si (KR); Pil Sook Kwon, Incheon (KR); Won Tae Kim, Suwon-si (KR); Han Joon Yoo, Seoul (KR); Dae Ho Lee, Seoul (KR); Nam Seok Roh, Seongnam-si (KR); Woo Jae Lee, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 168 days.

(21) Appl. No.: 14/026,497

(22) Filed: Sep. 13, 2013

(65) Prior Publication Data
US 2014/0267966 A1    Sep. 18, 2014

(30) Foreign Application Priority Data
Mar. 13, 2013  (KR) .......................... 10-2013-0026847

(51) Int. Cl.
G02F 1/1333    (2006.01)
G02F 1/1362    (2006.01)

(52) U.S. Cl.
CPC ...... *G02F 1/133345* (2013.01); *G02F 1/1362* (2013.01); *G02F 1/133377* (2013.01)

(58) Field of Classification Search
CPC ......... G02F 1/133345; G02F 1/133377; G02F 1/1362
See application file for complete search history.

(56) References Cited

U.S. PATENT DOCUMENTS

| 8,259,279 | B2 | 9/2012 | Shoraku et al. | |
| 2010/0080936 | A1* | 4/2010 | Park | C09K 19/44 428/1.52 |
| 2012/0062448 | A1* | 3/2012 | Kim | G02F 1/133377 345/55 |
| 2013/0093985 | A1* | 4/2013 | Kang | G02F 1/133377 349/106 |

(Continued)

FOREIGN PATENT DOCUMENTS

| JP | 2000-338504 A | 12/2000 |
| JP | 2002-006132 A | 1/2002 |

(Continued)

*Primary Examiner* — Paul Lee
(74) *Attorney, Agent, or Firm* — Cantor Colburn LLP

(57) ABSTRACT

A liquid crystal display includes a substrate; a thin film transistor on the substrate; a pixel electrode connected to the thin film transistor; a first insulating layer facing the pixel electrode; a plurality of microcavities each defined between the pixel electrode and the first insulating layer and including a liquid crystal injection hole exposing an inside of the microcavity; a liquid crystal layer including liquid crystal molecules, in the microcavities; a light blocking layer between adjacent microcavities; and a passivation layer member enclosing the light blocking layer.

12 Claims, 21 Drawing Sheets

(56) References Cited

U.S. PATENT DOCUMENTS

| | | |
|---|---|---|
| 2013/0321734 A1 | 12/2013 | Won et al. |
| 2014/0204316 A1 | 7/2014 | Kim et al. |
| 2014/0293205 A1 | 10/2014 | Kim et al. |

FOREIGN PATENT DOCUMENTS

| | | | |
|---|---|---|---|
| JP | 2004-219529 A | | 8/2004 |
| JP | 2005-208680 A | | 8/2005 |
| JP | 2009-169064 A | | 7/2009 |
| JP | 2012-133293 A | | 7/2012 |
| JP | 2012-159758 A | | 8/2012 |
| KR | 1020100089056 | * | 8/2010 |

* cited by examiner

LIQUID CRYSTAL DISPLAY COMPRISING A PLURALITY OF MICROCAVITIES FILLED WITH LIQUID CRYSTAL MOLECULES AND A LIGHT BLOCKING LAYER THAT FILLS A CONTACT HOLE

This application claims priority to Korean Patent Application No. 10-2013-0026847 filed on Mar. 13, 2013, and all the benefits accruing therefrom under 35 U.S.C. §119, the entire contents of which are incorporated herein by reference.

BACKGROUND (a) Field

The invention relates to a liquid crystal display and a manufacturing method thereof.

(b) Description of the Related Art

A liquid crystal display as one of flat panel display devices includes two display panels including field generating electrodes such as a pixel electrode and a common electrode, and a liquid crystal layer interposed between the two display panels.

The liquid crystal display generates an electric field in the liquid crystal layer by applying voltages to the field generating electrodes, to determine orientations of liquid crystal molecules of the liquid crystal layer and control polarization of incident light, thereby displaying an image.

A nanocrystal display ("NCD") liquid crystal display has been developed. In manufacturing the NCD liquid crystal display, a supporting member is provided on a sacrificial layer including an organic material and the like, and then the sacrificial layer is removed to define a space referred to as a nanocavity or microcavity. Liquid crystal material is filled in the empty nanocavity defined by removing the sacrificial layer.

SUMMARY

One or more exemplary embodiment of the invention provides a liquid crystal display including a light blocking layer that is not damaged due to a following manufacturing process which forms a microcavity, and a manufacturing method thereof.

One more exemplary embodiment of the invention also provides a liquid crystal display including a partition formation part supporting a microcavity without a roof layer, and a manufacturing method thereof.

An exemplary embodiment of a liquid crystal display according to the invention includes: a substrate; a thin film transistor on the substrate; a pixel electrode connected to the thin film transistor; a first insulating layer facing the pixel electrode; a plurality of microcavities each defined between the pixel electrode and the first insulating layer and including a liquid crystal injection hole exposing an inside of the microcavity; a liquid crystal layer including liquid crystal molecules, in the microcavities; a light blocking layer between adjacent microcavities; and a passivation layer member enclosing the light blocking layer.

The passivation layer member may include a first passivation layer between the pixel electrode and the light blocking layer, and a second passivation layer on the light blocking layer.

The first insulating layer may be in a same layer as the second passivation layer.

An interlayer insulating layer may be on the thin film transistor, and a contact hole may be defined in the interlayer insulating layer. The thin film transistor and the pixel electrode may be connected to each other through the contact hole.

The light blocking layer may cover the thin film transistor and fill the contact hole.

A light blocking member may be between the thin film transistor and the interlayer insulating layer, and an opening may be defined in the light blocking member and exposing the thin film transistor.

The passivation layer may include silicon nitride.

The thin film transistor may be connected to a gate line extending in a horizontal direction, and the light blocking layer may be extended according to a direction that the gate line extends.

A common electrode may be between the microcavities and the first insulating layer.

The passivation layer member may include a first passivation layer between the pixel electrode and the light blocking layer, and a second passivation layer on the light blocking layer, and a patterned portion of the common electrode and a patterned portion of the second passivation layer may be on the light blocking layer.

A roof layer may be on the first insulating layer, and the roof layer may include an organic material.

A partition formation part may be between the microcavities, and the partition formation part may include a same material as the light blocking layer.

The thin film transistor may be connected to a data line extending in a vertical direction, and the partition formation part may extend according to a direction that the data line extends.

A common electrode may be between the microcavity and the first insulating layer, and the common electrode and the first insulating layer may be on the partition formation part.

Another exemplary embodiment of a liquid crystal display according to the invention includes: a substrate; a thin film transistor on the substrate; a pixel electrode connected to the thin film transistor; a common electrode facing the pixel electrode; a first insulating layer and a second insulating layer on the common electrode; a plurality of microcavities each defined between the pixel electrode and the common electrode and including a liquid crystal injection hole exposing an inside of the microcavity; a liquid crystal layer including liquid crystal molecules, in the microcavities; and a partition formation part between adjacent microcavities. The common electrode and the first insulating layer are between the partition formation part and the substrate, and the second insulating layer is on the partition formation part.

The first insulating layer may contact the second insulating layer in a region corresponding to the microcavities.

The partition formation part may include an organic material.

The thin film transistor may be connected to a data line extending in a vertical direction, and the partition formation part may be extended according to a direction that the data line extends.

A capping layer may be on the second insulating layer and covering the liquid crystal injection hole, and a groove may be between the microcavities adjacent in a direction parallel to the direction that the partition formation part extends, and the capping layer may cover the groove.

An exemplary embodiment of a method of manufacturing a liquid crystal display according to the invention includes: providing a thin film transistor on a substrate; providing an interlayer insulating layer on the thin film transistor; providing a pixel electrode on the interlayer insulating layer;

providing a sacrificial layer on the pixel electrode; providing a first passivation layer material and a light blocking material on the sacrificial layer and the thin film transistor; patterning the first passivation layer material and the light blocking material to form a first passivation layer and a light blocking layer covering the thin film transistor; providing a second passivation layer on the sacrificial layer and the light blocking layer; and removing the sacrificial layer to form a microcavity including a liquid crystal injection hole which exposes an inside of the microcavity. The first passivation layer and the second passivation layer enclose the light blocking layer.

The providing an interlayer insulating layer on the thin film transistor may include defining a contact hole in the interlayer insulating layer, and the pixel electrode may be connected to the thin film transistor through the contact hole.

The light blocking layer may cover the thin film transistor and fills the contact hole.

The method may further include providing a light blocking member between the thin film transistor and the interlayer insulating layer, and providing an opening in the light blocking member to expose the thin film transistor.

The thin film transistor may be connected to a gate line extending in a horizontal direction, and the light blocking layer may extend according to a direction that the gate line extends.

The method may include providing a common electrode between the sacrificial layer and the second passivation layer.

The common electrode may be between the light blocking layer and the second passivation layer.

The light blocking material may be patterned to form a partition formation part between adjacent microcavities.

The partition formation part and the light blocking layer may be in a same layer.

The thin film transistor may be connected to a data line extending in a vertical direction, and the partition formation part may extend according to a direction that the data line extends.

The method may include providing a common electrode between the sacrificial layer and the second passivation layer, and the common electrode and the second passivation layer may be on the partition formation part.

Another exemplary embodiment of a manufacturing method of a liquid crystal display according to the invention includes: providing a thin film transistor on a substrate; providing an interlayer insulating layer on the thin film transistor; providing a pixel electrode on the interlayer insulating layer; providing a plurality of sacrificial layers on the pixel electrode; providing a common electrode and a first insulating layer on the sacrificial layers; providing a partition formation part between adjacent sacrificial layers; providing a second insulating layer on the plurality of sacrificial layers and the partition formation part; and removing the plurality of sacrificial layers to form a plurality of microcavities each including a liquid crystal injection hole exposing an inside of the microcavity. The common electrode and the first insulating layer are between the partition formation part and the substrate, and the second insulating layer is on the partition formation part.

The first insulating layer may contact the second insulating layer in a region corresponding to the microcavities.

The partition formation part may include an organic material.

The thin film transistor may be connected to a data line extending in a vertical direction, and the partition formation part may extend according to a direction that the data line extends.

The method may further include providing a capping layer covering the liquid crystal injection hole on the second insulating layer, and providing a groove between microcavities adjacent in a direction parallel to a direction that the partition formation part extends. The capping layer may fill the groove.

According to one or more exemplary embodiment of the invention, the light blocking layer is provided after the pixel electrode and is enclosed by the passivation layer such that the light blocking layer is not damaged in the process such as the ashing to form the microcavity.

Also, according to one or more exemplary embodiment of the invention, when omitting the roof layer, the partition formation part between the microcavities supports the microcavities such that a resistance force against an external impact is reinforced.

BRIEF DESCRIPTION OF THE DRAWINGS

The above and other features of the invention will become more apparent by describing in further detail exemplary embodiments thereof with reference to the accompanying drawings, in which.

DETAILED DESCRIPTION

Figure 1:
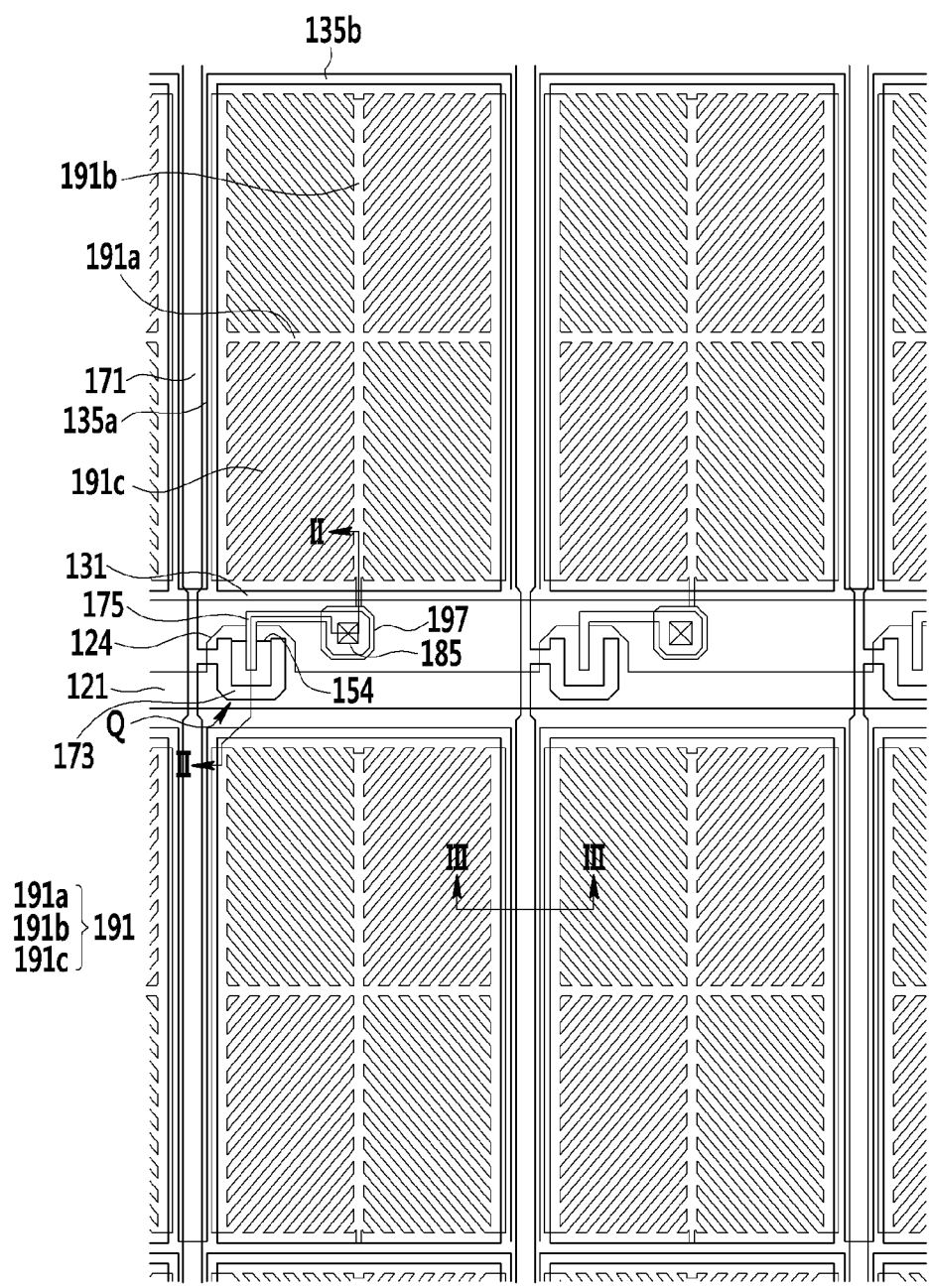
FIG. 1 is a top plan view of an exemplary embodiment of a liquid crystal display according to the invention.

Exemplary embodiments of the invention will be described in detail with reference to the attached drawings. The invention may be modified in many different forms, and should not be construed as being limited to the exemplary embodiments set forth herein. Rather, the exemplary embodiments of the invention are provided so that this disclosure will be thorough and complete, and will fully convey the concept of the invention to those skilled in the art.

In the drawings, the thickness of layers and regions may be exaggerated for clarity. In addition, when a layer is described to be formed on another layer or on a substrate, this means that the layer may be on the other layer or on the substrate, or a third layer may be interposed between the layer and the other layer or the substrate. Like numbers refer to like elements throughout the specification. As used herein, connected may refer to elements being physically and/or electrically connected to each other. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the invention.

Spatially relative terms, such as "lower," "under," "above," "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "under" relative to other elements or features would then be oriented "above" relative to the other elements or features. Thus, the exemplary term "under" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises," "comprising," "includes" and/or "including," when used in this specification, specify the presence of stated features, integers, operations, elements, and/or components, but do not preclude the presence or addition of one or more other features, integers, steps, operations, elements, components, and/or groups thereof.

Embodiments of the invention are described herein with reference to cross-section illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

All methods described herein can be performed in a suitable order unless otherwise indicated herein or otherwise clearly contradicted by context. The use of any and all examples, or exemplary language (e.g., "such as"), is intended merely to better illustrate the invention and does not pose a limitation on the scope of the invention unless otherwise claimed. No language in the specification should be construed as indicating any non-claimed element as essential to the practice of the invention as used herein.

In a manufacturing process of a nanocrystal display ("NCD") liquid crystal display, for repair of a display panel thin film transistor, a light blocking member may be opened in a thin film transistor formation region to expose the thin film transistor. To reduce or effectively prevent light generation of leakage in the thin film transistor formation region where the light blocking member is opened, an additional light blocking layer may be provided after providing the pixel electrode. However, in a following process such as an ashing process to form the microcavity, the additional light blocking layer may be damaged.

Additionally, a NCD liquid crystal display may include a roof layer including an organic material, but the roof layer is weak against a thermal process used in manufacturing the NCD liquid crystal display. As a result, an NCD liquid crystal display omitting the roof layer has been developed. However, where the roof layer is omitted, the microcavity may be undesirably damaged in the manufacturing process.

Therefore, the remains a need for an improved liquid crystal display and manufacturing method thereof, which reduces or effectively prevents damage to elements of the liquid crystal display.

Hereinafter, the invention will be described in detail with reference to the accompanying drawings.

Figure 2:
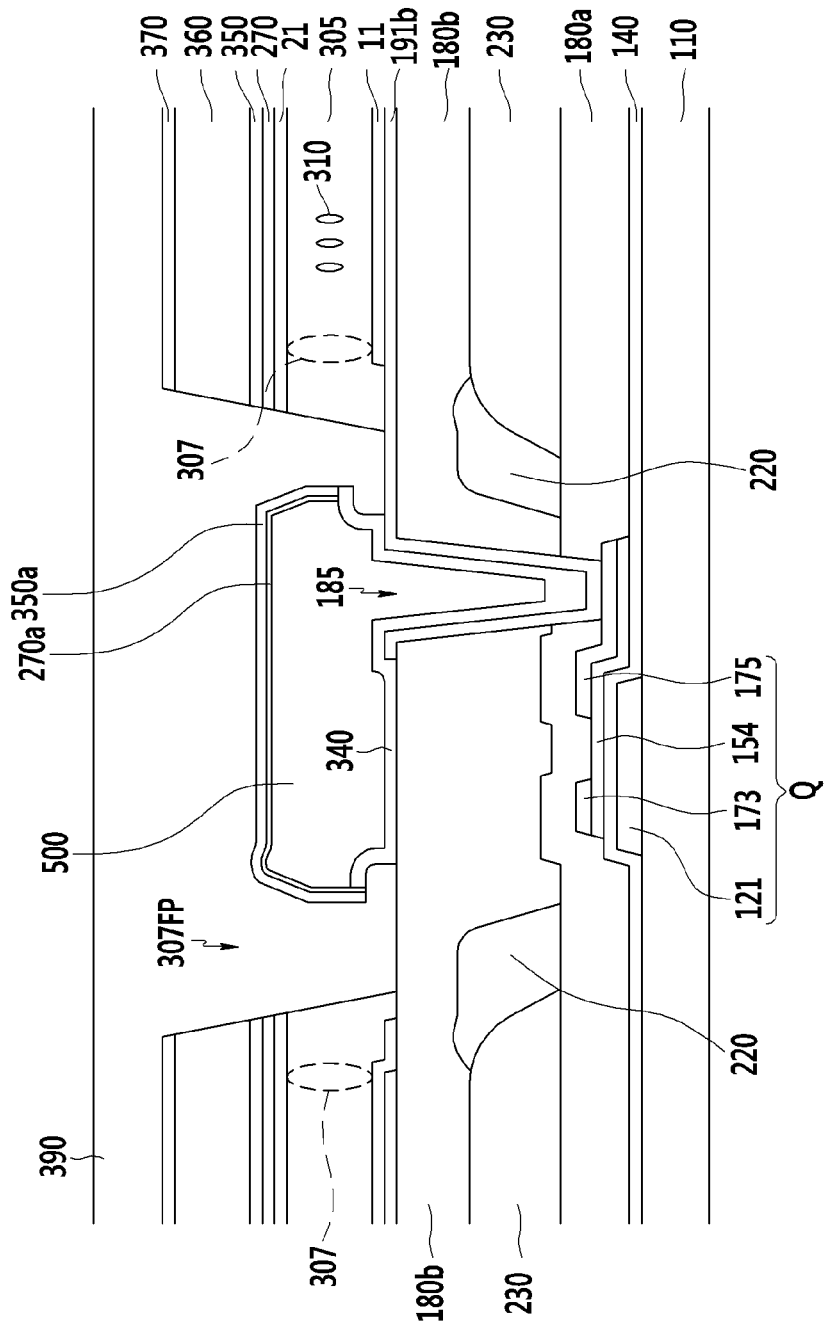
FIG. 2 is a cross-sectional view taken along line II-II of FIG. 1.
Figure 3:
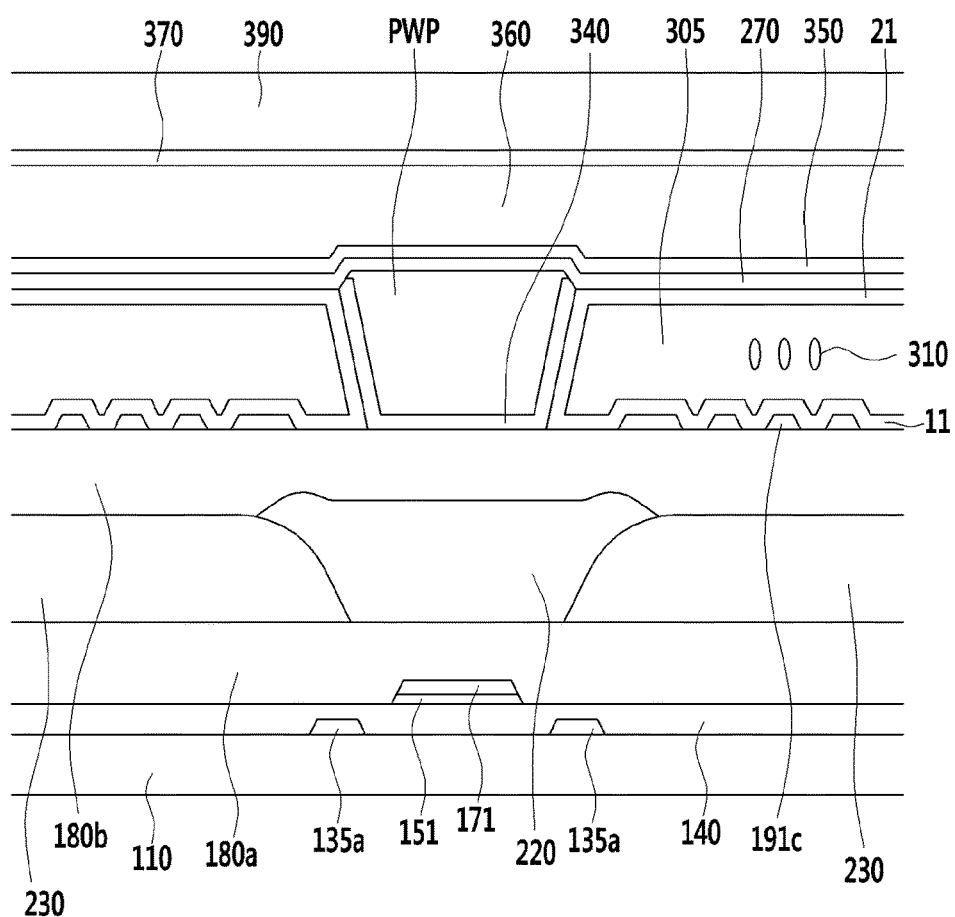
FIG. 3 is a cross-sectional view taken along line III-III of FIG. 1.

FIG. 1 is a top plan view of an exemplary embodiment of a liquid crystal display according to the invention. FIG. 2 is a cross-sectional view taken along line II-II of FIG. 1. FIG. 3 is a cross-sectional view taken along line III-III of FIG. 1.

A plurality of pixels or pixel areas may be defined in the liquid crystal display. A pixel or pixel area may be defined as an independent unit capable of independently controlling liquid crystal in the liquid crystal display. In an exemplary embodiment, the pixel or pixel area may correspond to a color filter, but the invention is not limited thereto.

Referring to FIG. 1 to FIG. 3, a gate line 121 and a storage electrode line 131 are disposed on an insulation substrate 110 including transparent glass or plastic. The gate line 121 includes a gate electrode 124 extended from a main portion thereof. The storage electrode line 131 is mainly extended in a first (e.g., transverse) direction, and transfers a predetermined voltage such as a common voltage Vcom. The storage electrode line 131 includes a pair of longitudinal portions 135a extending from a main portion thereof and in a second (e.g., longitudinal) direction substantially perpendicular to the gate line 121, and a transverse portion 135b connecting ends of the pair of longitudinal portions 135a. A storage electrode includes the pair of longitudinal portions 135a and the transverse portion 135b and has a structure enclosing a pixel electrode 191, in the plan view.

A gate insulating layer 140 is disposed on the gate line 121 and the storage electrode line 131. A semiconductor 151 positioned below a data line 171, a semiconductor 154 positioned below a source electrode 173 and a drain electrode 175, and a channel portion of a thin film transistor Q are disposed on the gate insulating layer 140.

A plurality of ohmic contacts (not shown) may be disposed on each of the semiconductors 151 and 154, between the data line 171 and the source electrode 173, and between the data line 171 and the drain electrode 175.

A data conductor including the data line 171, the source electrode 173 extended from a main portion of the data line 171 and connected to the data line 171, and the drain electrode 175 are respectively disposed on each of the semiconductor layers 151 and 154 and the gate insulating layer 140.

The gate electrode 124, the source electrode 173 and the drain electrode 175 form the thin film transistor Q along with the semiconductor layer 154, and a portion of the semiconductor layer 154 between the source electrode 173 and the drain electrode 175 forms a channel of the thin film transistor Q. The portion of the semiconductor layer 154 forming the channel is exposed by the source and drain electrodes 173 and 175

A first interlayer insulating layer 180a is disposed on the data conductor 171, 173, and 175, and the exposed semiconductor layer 154. The first interlayer insulating layer 180a may include an inorganic insulator such as silicon nitride (SiNx) and silicon oxide (SiOx), or an organic insulator.

A color filter 230 and a light blocking member 220 are disposed on the first interlayer insulating layer 180a.

The light blocking member 220 has a lattice structure in the plan view and an opening corresponding to a region displaying an image is defined in the light blocking member 220. The light blocking member 220 includes a material through which light is not transmitted. The color filter 230 is disposed in the opening defined in the light blocking member 220.

In the illustrated exemplary embodiment, an opening is further defined in the light blocking member 220 to expose the thin film transistor Q, such that the thin film transistor Q can be accessed such as to repair the thin film transistor Q in a manufacturing process of the liquid crystal display. In other words, an overall opening defined in the light blocking member 220 may include an open region where the thin film transistor Q is disposed.

The color filter 230 may display one of primary colors such as three primary colors of red, green and blue. However, the color filter 230 may also display one of cyan, magenta, yellow and white colors, such that the invention is not limited to the three primary colors of red, green and blue. The color filter 230 may include a material displaying different colors for adjacent pixels or pixel areas.

A second interlayer insulating layer 180b is disposed on the color filter 230 and the light blocking member 220 so as to cover the color filter 230 and the light blocking member 220. The second interlayer insulating layer 180b may include the inorganic insulator such as silicon nitride (SiNx) and silicon oxide (SiOx), or the organic insulator. As shown in the cross-sectional view of FIG. 2, where a step occurs due to a thickness difference between the color filter 230 and the light blocking member 220, the second interlayer insulating layer 180b including the organic insulator, thus reducing or removing the step and essentially providing a planarized surface layer.

A contact hole 185 is defined in the color filter 230, the light blocking member 220, and the interlayer insulating layers 180a and 180b and expose the drain electrode 175.

The pixel electrode 191 is disposed on the second interlayer insulating layer 180b. The pixel electrode 191 may include a transparent conductive material such as indium tin oxide ("ITO") or indium zinc oxide ("IZO").

The pixel electrode 191 has an overall planar shape of a quadrangle. The pixel electrode includes a cross-shaped stem portion that is configured of a horizontal stem 191a, and a vertical stem 191b intersecting the horizontal stem 191a. Further, the pixel electrode 191 includes a protrusion 197 protruding from an edge of the pixel electrode 191. Further, the pixel electrode 191 has four sub-regions because of the horizontal stem 191a and the vertical stem 191b, and each of the sub-regions includes a plurality of fine branch portions 191c. Also, in the illustrated exemplary embodiment, the pixel electrode 191 further includes an outer stem enclosing the outer portion.

The fine branch portions 191c extend lengthwise in an extension direction, and a width of the fine branch portions 191c is taken perpendicular to the extension direction. The extension direction of the fine branch portions 191c of the pixel electrode 191 form an angle of about 40 degrees to about 45 degrees with an extension direction of the gate line 121 or the horizontal (e.g., transverse) stem 191a. Further, the extension directions of the minute branches 191c of two adjacent subregions may be perpendicular to each other. In addition, a width of the fine branch may become gradually larger or intervals between the fine branches 191c may be different from each other.

The pixel electrode 191 is physically and electrically connected to the drain electrode 175 through the contact hole 185, and receives a data voltage from the drain electrode 175.

The description of the thin film transistor Q and the pixel electrode 191 is one example, and to improve lateral visibility, the structure of the thin film transistor and the design of the pixel electrode may vary.

A lower alignment layer 11 is disposed on the pixel electrode 191, and may be a vertical alignment layer. The lower alignment layer 11 as a liquid crystal alignment layer made include a material such as polyamic acid, polysiloxane, or polyimide may include at least one among generally-used materials.

An upper alignment layer 21 is positioned at a portion corresponding to the lower alignment layer 11, and a microcavity 305 is defined between the lower alignment layer 11 and the upper alignment layer 21. A liquid crystal material including liquid crystal molecules 310 is disposed in the microcavity 305 through a liquid crystal injection hole 307. The microcavity 305 may lengthwise extend according to the column direction of the pixel electrode 191, in other words, the vertical direction in the plan view. In an exemplary embodiment of a method of manufacturing the liquid crystal display, alignment material of the alignment layers 11 and 21 and the liquid crystal material including the liquid crystal molecules 310 may be injected into the microcavity 305 by using capillary force.

The microcavity 305 is divided in the vertical direction by a plurality of liquid crystal injection hole formation regions 307FP positioned at a portion overlapping the gate line 121. The liquid crystal injection hole formation regions 307FP are disposed in plural according to the direction that the gate line 121 extends. A plurality of microcavities 305 may respectively correspond to a pixel area, and the pixel area may correspond to a region displaying images.

In the exemplary embodiment, the liquid crystal display includes only one substrate, for example, a lower substrate. In a method of manufacturing the liquid crystal display, the liquid crystal material is injected through the liquid crystal injection holes 307 of the microcavity layer 305 such that the liquid crystal display may exclude a separate upper substrate.

A common electrode 270 and a lower insulating layer 350 are positioned on the upper alignment layer 21. The common electrode 270 receives a common voltage, and forms an electric field along with the pixel electrode 191 applied with a data voltage to determine an inclination direction of the liquid crystal molecules 310 positioned in the microcavity 305 between the two electrodes 270 and 191. The common electrode 270 forms a capacitor along with the pixel electrode 191 such that the applied voltage is maintained after the thin film transistor Q is turned off. The lower insulating layer 350 may include silicon nitride (SiNx) or silicon oxide (SiO2).

In the illustrated exemplary embodiment, the common electrode 270 is disposed on the microcavity 305, that is, above the microcavity 305. However, as another exemplary embodiment, the common electrode 270 is disposed under the microcavity 305 thereby driving the liquid crystal according to a coplanar electrode ("CE") mode.

A roof layer 360 is positioned on the lower insulating layer 350. The roof layer 360 has a supporting function such that the microcavity 305 as a space between the pixel electrode 191 and the common electrode 270, is maintained. The roof layer 360 may include silicon oxycarbide (SiOC), a photoresist or other organic materials. In an exemplary embodiment of manufacturing the liquid crystal display, when the roof layer 360 includes the silicon oxycarbide (SiOC), the roof layer 360 may be formed by a chemical vapor deposition method, while when including the photoresist, the roof layer 360 may be formed by a coating method. The silicon oxycarbide (SiOC) has a merit that transmittance is high and layer stress is low thereby reducing or effectively preventing a change among layers that may be formed by the chemical vapor deposition method. Accordingly, in the illustrated exemplary embodiment, by forming the roof layer 360 of the silicon oxycarbide (SiOC), light may be transmitted well and a stable layer may be formed.

An upper insulating layer 370 is positioned on the roof layer 360. The upper insulating layer 370 may contact an upper surface of the roof layer 360. The upper insulating layer 370 may include silicon nitride (SiNx) or silicon oxide (SiO2). A capping layer 390 is positioned on the upper insulating layer 370. The capping layer 390 contacts the upper surface and the side surface of the upper insulating layer 370. The capping layer 390 covers the liquid crystal injection hole 307 of the microcavity 305 exposed by the liquid crystal injection hole formation region 307FR. The capping layer 390 may include a thermal hardening resin, silicon oxycarbide (SiOC), or graphene.

In a method of manufacturing the liquid crystal display, when the capping layer 390 is formed of the graphene, the graphene has transmission resistance against a gas including helium, thereby maintaining a function of a capping layer for capping the liquid crystal injection hole 307. The capping layer 390 may include a carbon combination such that the liquid crystal material in the microcavity 305 is not contaminated even when contacted with the liquid crystal material. Also, the graphene protects the liquid crystal material from oxygen or moisture introduced to the liquid crystal display from the outside.

An overcoat (not shown) including an organic layer or an inorganic layer may be positioned on the capping layer 390. The overcoat may protect the liquid crystal molecules 310 injected into the microcavity layer 305 from an external impact, and may flatten the layers to provide a planarized surface.

In the illustrated exemplary embodiment, as shown in FIG. 2, the liquid crystal injection hole formation region 307FP is disposed between the microcavities 305 adjacent in the vertical direction. A light blocking layer 500 covering the thin film transistor Q and filling the contact hole 185 is disposed in the liquid crystal injection hole formation region 307FP. The light blocking layer 500 includes a material capable of blocking light to reduce a leakage current of the thin film transistor Q caused by external light and to prevent a reduction of a contrast ratio due to reflected light. The light blocking layer 500 may include an organic material. The light blocking layer 500 may include the same material as the light blocking member 220. In the illustrated exemplary embodiment, the light blocking layer 500 may lengthwise extend according to the direction that the gate line 121 extends.

A first passivation layer 340 is positioned under the light blocking layer 500, and a common electrode portion 270a and a second passivation layer 350a are positioned on (e.g., above) the light blocking layer 500. The first passivation layer 340 and the second passivation layer 350a are disposed to not expose any portion of the light blocking layer 500 while completely enclosing the light blocking layer 500. A passivation layer member including the first passivation layer 340 and the second passivation layer 350a may include silicon nitride.

The first passivation layer 340 may only be disposed in the liquid crystal injection hole formation region 307FP, and the second passivation layer 350a may be disposed in and/or on a same layer as the lower insulating layer 350.

The capping layer 390 may cover the light blocking layer 500 as well as the liquid crystal injection hole 307, and may fill the liquid crystal injection hole formation region 307FP between the microcavity 305 and the light blocking layer 500.

In the illustrated exemplary embodiment, as shown in FIG. 3, a partition formation part PWP is disposed between the microcavities 305 adjacent in the horizontal direction. The partition formation part PWP may lengthwise extend according to the direction that the data line 171 extends. In an exemplary embodiment of manufacturing the liquid crystal display, the partition formation part PWP may be simultaneously formed with the light blocking layer 500, such that the partition formation part PWP and the light blocking layer 500 are in and/or on a same layer. Accordingly, the partition formation part PWP may include a same material as the light blocking layer 500.

The first passivation layer 340 is disposed at the end and the side surface of the partition formation part PWP. In an exemplary embodiment of manufacturing the liquid crystal display, the first passivation layer 340 at the end and the side surface of the partition formation part PWP is simultaneously formed with the same material as the first passivation layer 340 under the light blocking layer 500. However, in an alternative exemplary embodiment, the first passivation layers 340 may have a structure that is divided in a patterning process.

The common electrode 270 and the lower insulating layer 350 cover the partition formation part PWP.

A polarizer (not shown) is positioned under the insulation substrate 110 and above the upper insulating layer 370. The polarizer may include a polarized element generating polarization and a tri-acetyl-cellulose ("TAC") layer for ensuring durability. According to an exemplary embodiment, directions of transmissive axes of an upper polarizer and a lower polarizer may be perpendicular or parallel to each other.

Next, with reference to FIG. 4 to FIG. 8, an exemplary embodiment of manufacturing the above-described liquid crystal display will be described. FIGS. 4A, 5A, 6A and 7A are perspective views explaining an exemplary embodiment of a manufacturing method of a liquid crystal display according to the invention, and FIGS. 4B, 5B, 6B, 7B and 8 are cross-sectional views explaining the manufacturing method of a liquid crystal display.

Figure 4A:
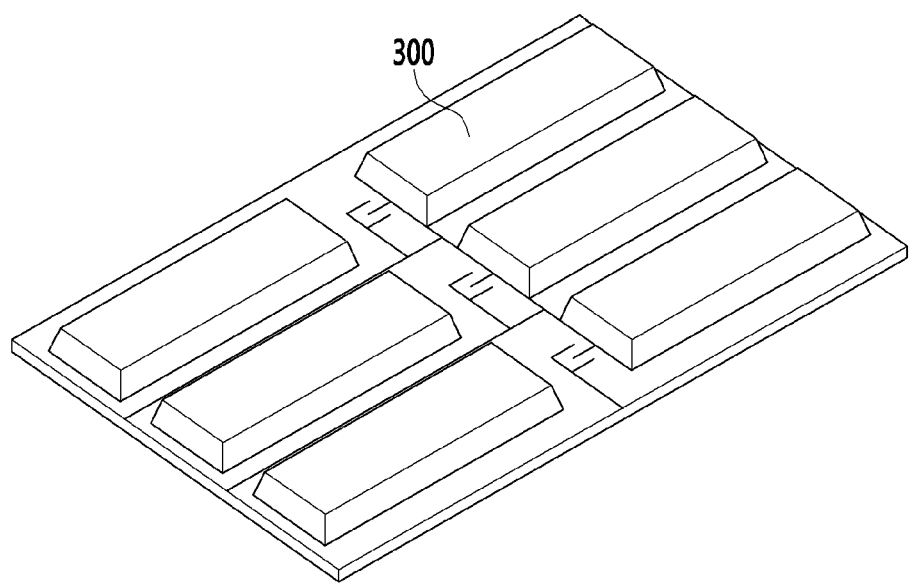
FIGS. 4A, 5A, 6A and 7A are perspective views explaining an exemplary embodiment of a manufacturing method of a liquid crystal display according to the invention.
Figure 4B:
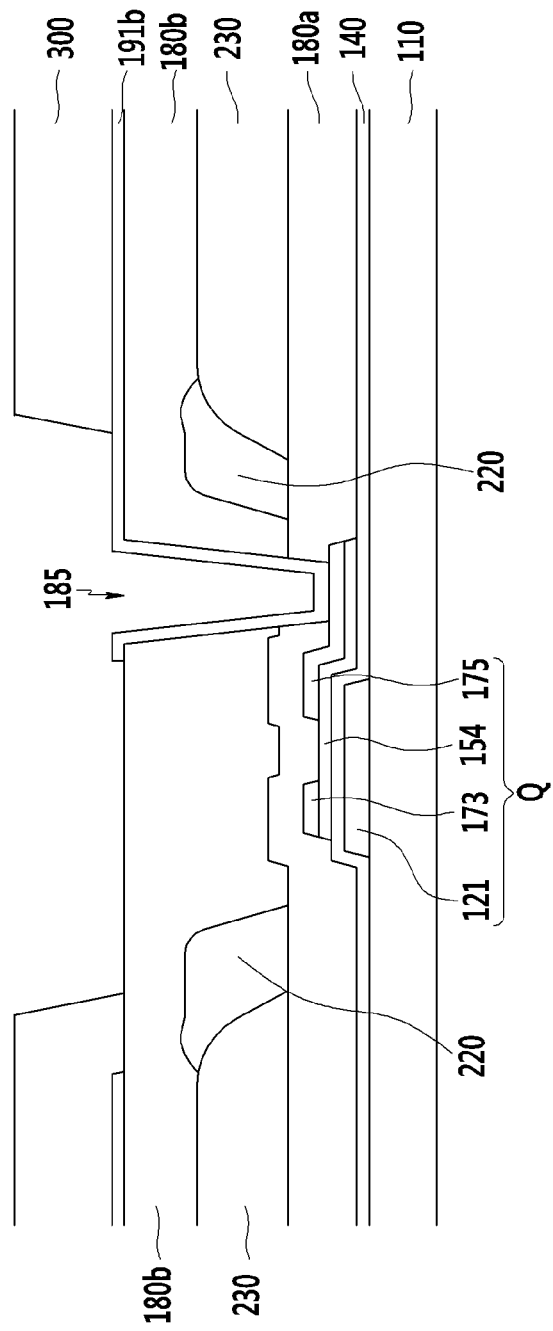
FIGS. 4B, 5B, 6B, 7B and FIG. 8 are cross-sectional views explaining the manufacturing method of a liquid crystal display according to the invention.

Referring to FIG. 1, FIG. 4A, and FIG. 4B, to form (e.g., provide) a switching element (e.g., thin film transistor) on a substrate 110, a gate line 121 lengthwise extending in the horizontal direction, a gate insulating layer 140 on the gate line 121, semiconductor layers 151 and 154 on the gate insulating layer 140, and a source electrode 173 and a drain electrode 175 are formed. A data line 171 connected to the source electrode 173 may be formed to be lengthwise extended in the vertical direction while intersecting the gate line 121.

The first interlayer insulating layer 180a is formed on the data conductor including the source electrode 173, the drain electrode 175 and the data line 171, and on the exposed semiconductor layer 154.

A color filter 230 is formed on the first interlayer insulating layer 180a at the position corresponding to a pixel area, and a light blocking member 220 is formed between the color filters 230. The light blocking member 220 is formed to expose the thin film transistor Q so that the thin film transistor Q may be accessed such as for repair, in the manufacturing process.

The second interlayer insulating layer 180b is formed on the color filter 230 and the light blocking member 220 while covering the color filter 230 and the light blocking member 220. A contact hole 185 is defined in the second interlayer insulating layer 180b to electrically and physically connect the pixel electrode 191 and the drain electrode 175.

Next, the pixel electrode 191 is formed on the second interlayer insulating layer 180b, and a sacrificial layer 300 is formed on the pixel electrode 191. As shown in FIG. 4A, the sacrificial layer 300 may be formed to correspond to the pixel area while exposing the thin film transistor Q.

Figure 5A:
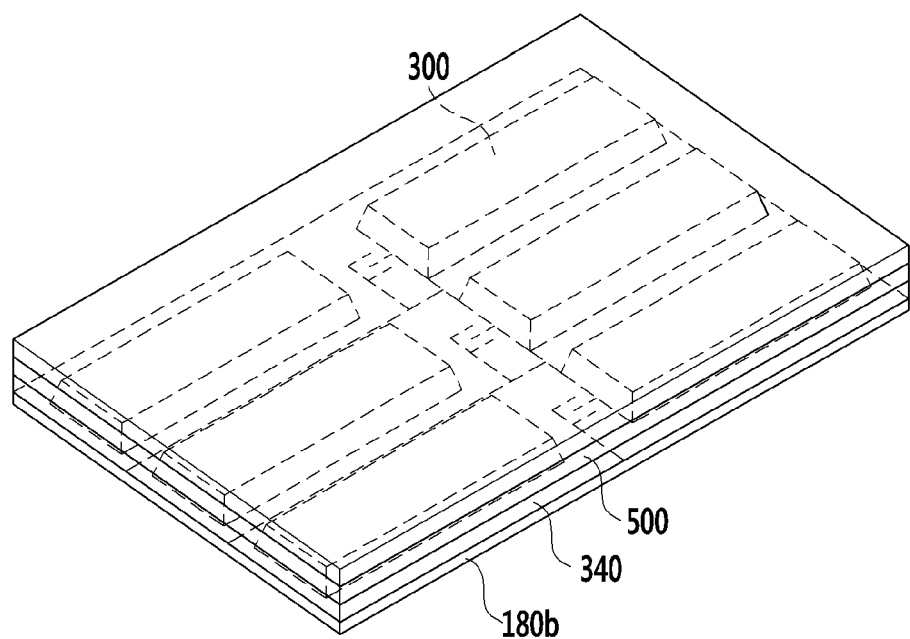
Figure 5B:
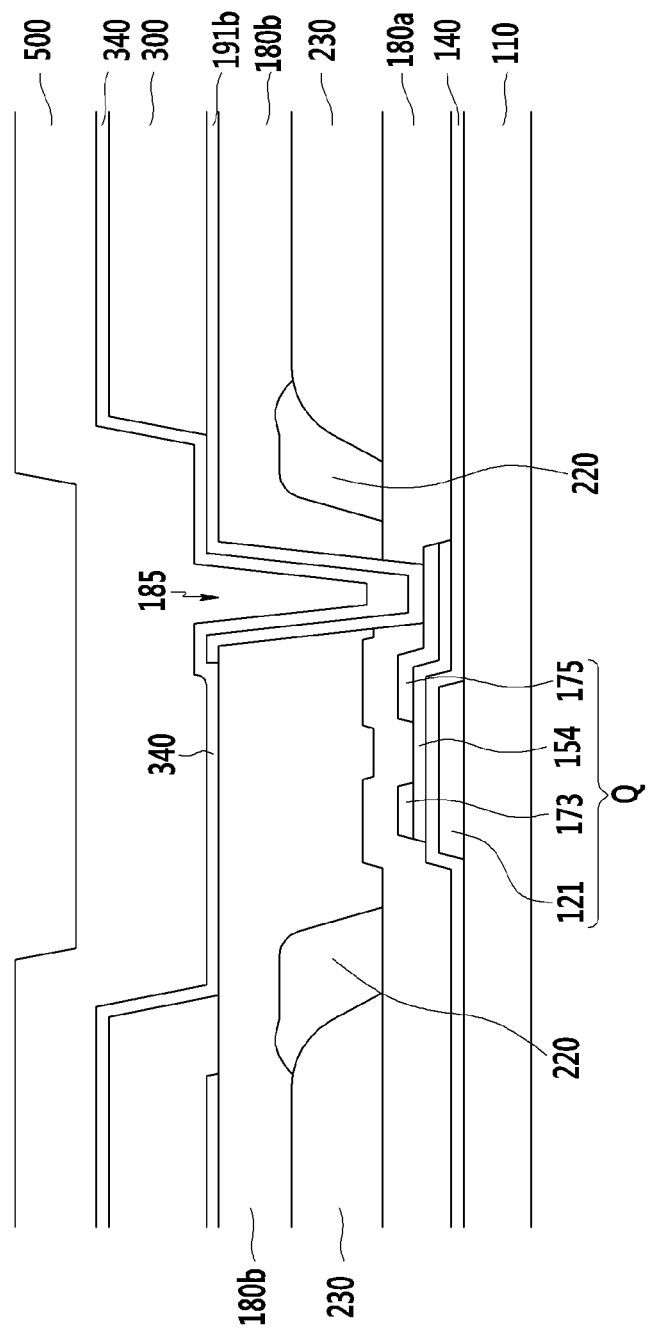

Referring to FIG. 1, FIG. 5A, and FIG. 5B, the first passivation layer 340 and the light blocking layer 500 covering the sacrificial layer 300 and the exposed second interlayer insulating layer 180b are deposited. The material forming the first passivation layer 340 and the light blocking layer 500 may respectively be the silicon nitride and the organic material blocking the light, as described above.

Figure 6A:
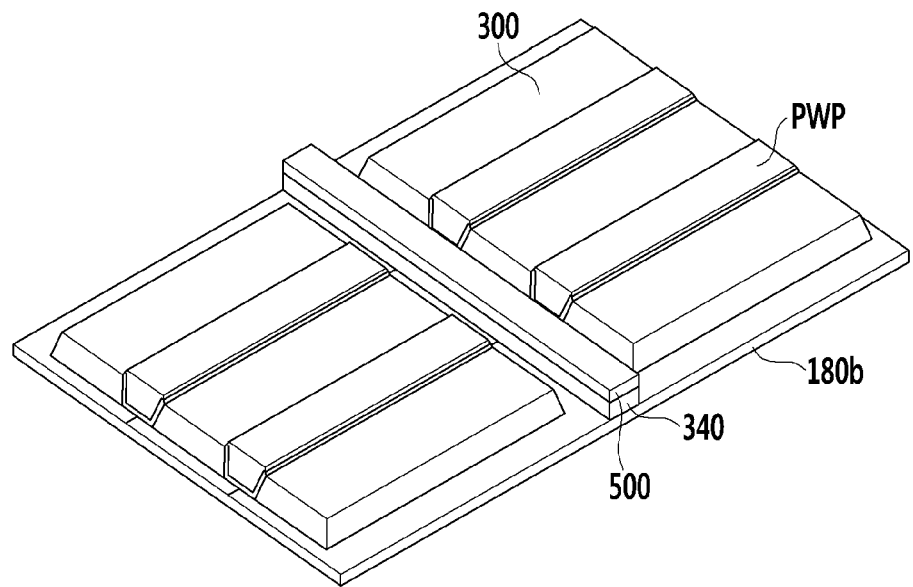
Figure 6B:
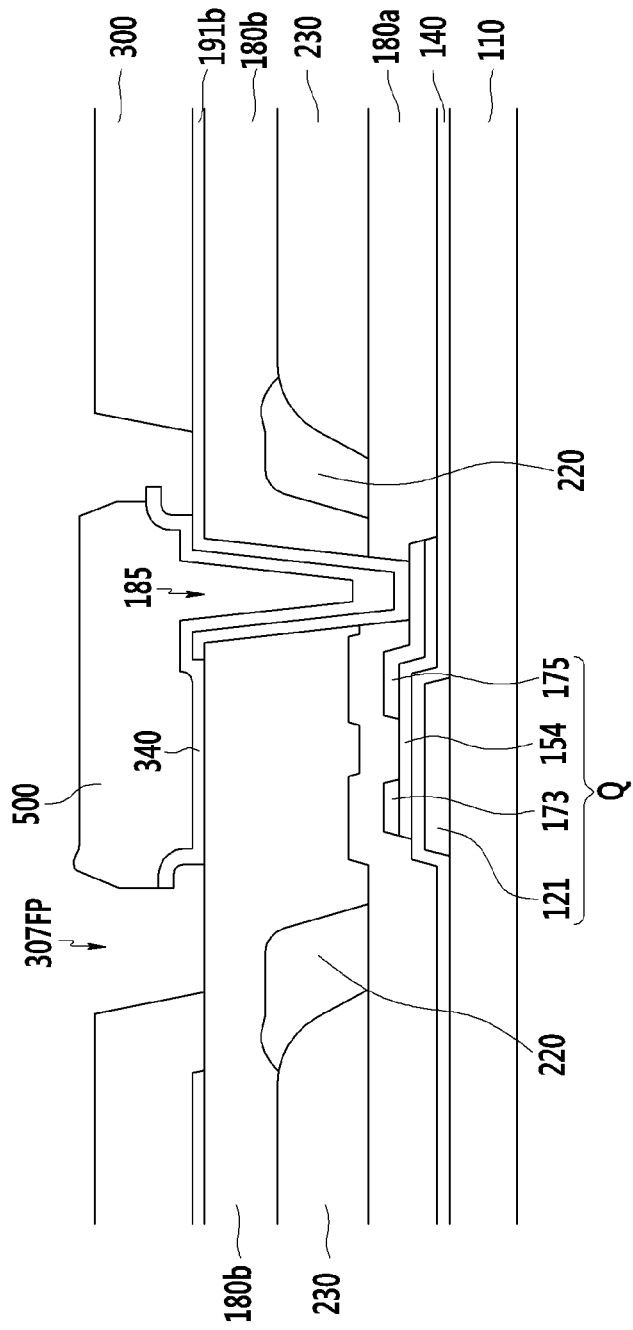

Referring to FIG. 1, FIG. 6A, and FIG. 6B, the light blocking layer 500 and the first passivation layer 340 are simultaneously patterned to form the first passivation layer 340 and a light blocking layer 500 positioned lengthwise extending according to the direction that the gate line 121 extends. The first passivation layer 340 and the light blocking layer 500 are in a same layer and include a same material. In the patterning of the first passivation layer 340 and a light blocking layer 500, the portion of the first passivation layer 340 and the light blocking layer 500 deposited on (e.g., overlapping) the sacrificial layer 300 may be removed. Also, a partition formation part PWP positioned lengthwise extending according to the direction that the data line 171 extends may be formed between portions of the sacrificial layer 300. The partition formation part PWP has the final structure described in FIG. 3 from the patterning of the first passivation layer 340 and a light blocking layer 500. However, different from the illustrated exemplary embodiment, without the partition formation part PWP, the roof layer 360 may be filled into the space between the sacrificial layers 300 adjacent in the extension direction of the gate line 121 in the following process.

Here, the light blocking layer 500 is formed to be separated from the sacrificial layer 300 as shown in FIG. 6A and FIG. 6B.

Figure 7A:
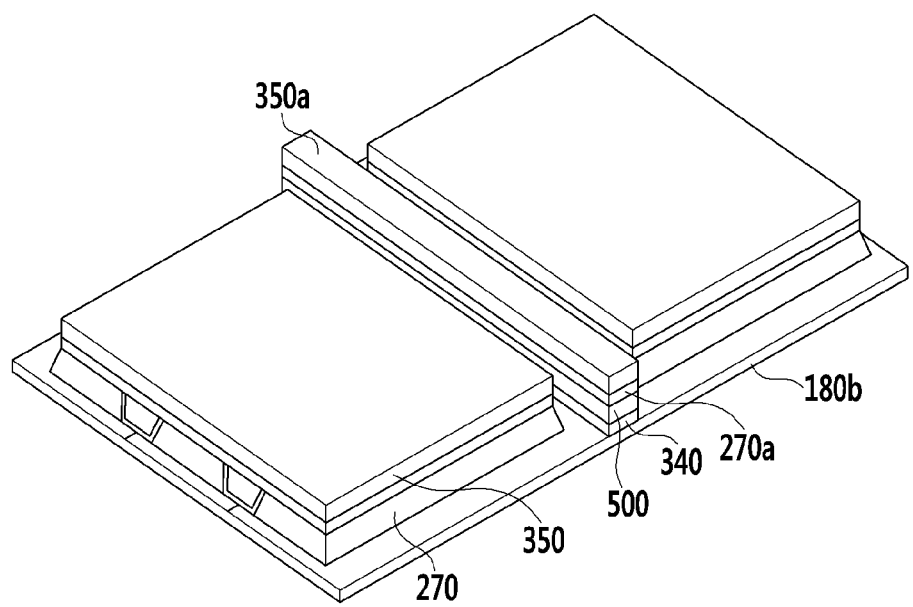
Figure 7B:
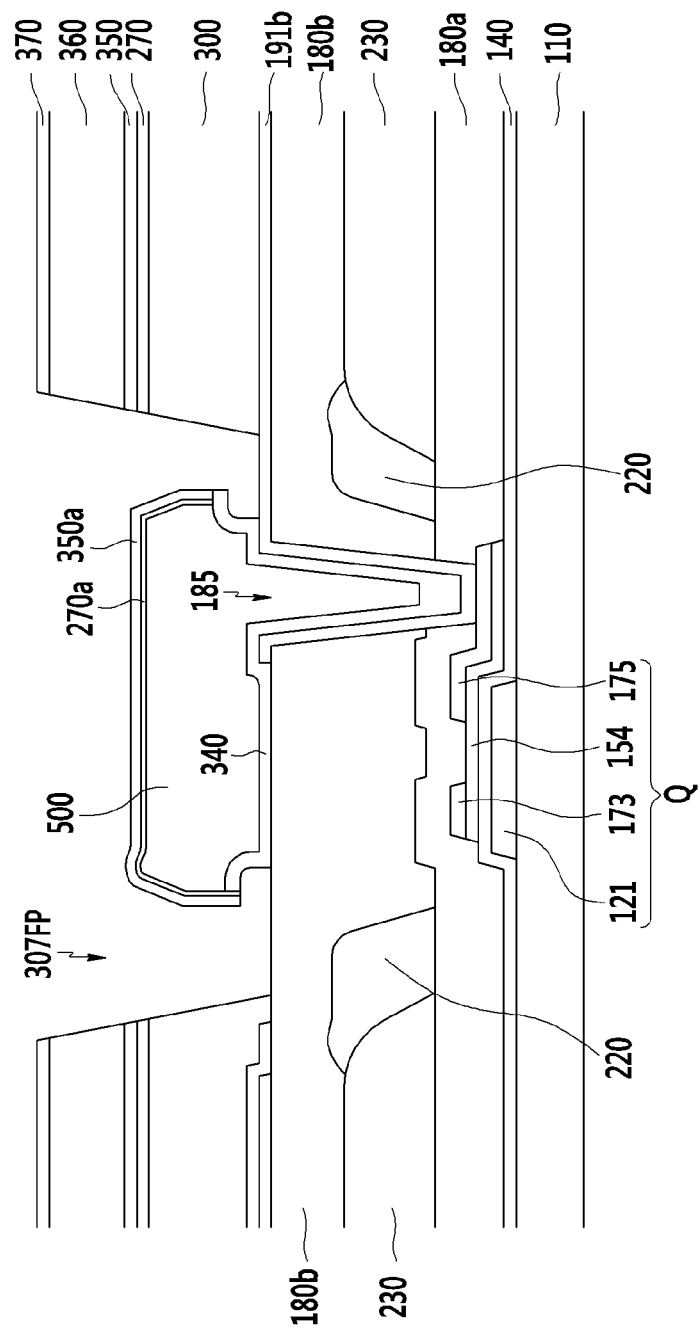

Referring to FIG. 1, FIG. 7A, and FIG. 7B, a common electrode 270, a lower insulating layer 350, a common electrode portion 270a, the second passivation layer 350a, a roof layer 360 and an upper insulating layer 370 are formed on the sacrificial layer 300 and the light blocking layer 500.

The common electrode 270 and the common electrode portion 270a are formed to be respectively positioned on the sacrificial layer 300 and the light blocking layer 500 by simultaneously depositing and patterning the same material. That is, the common electrode 270 and the common electrode portion 270a are in a same layer. Likewise, the lower insulating layer 350 and the second passivation layer 350a are formed to be respectively positioned on the sacrificial layer 300 and the light blocking layer 500 by simultaneously depositing and patterning the same material. That is, the lower insulating layer 350 and the second passivation layer 350a are in a same layer. The light blocking layer 500 is positioned in the liquid crystal injection hole formation region 307FP in the space between the sacrificial layers 300 adjacent in the direction of the data line 171. Here, the common electrode portion 270a and the second passivation layer 350a are formed to completely enclose the light blocking layer 500 along with the first passivation layer 340, and the light blocking layer 500 is not exposed to the outside.

Figure 8:
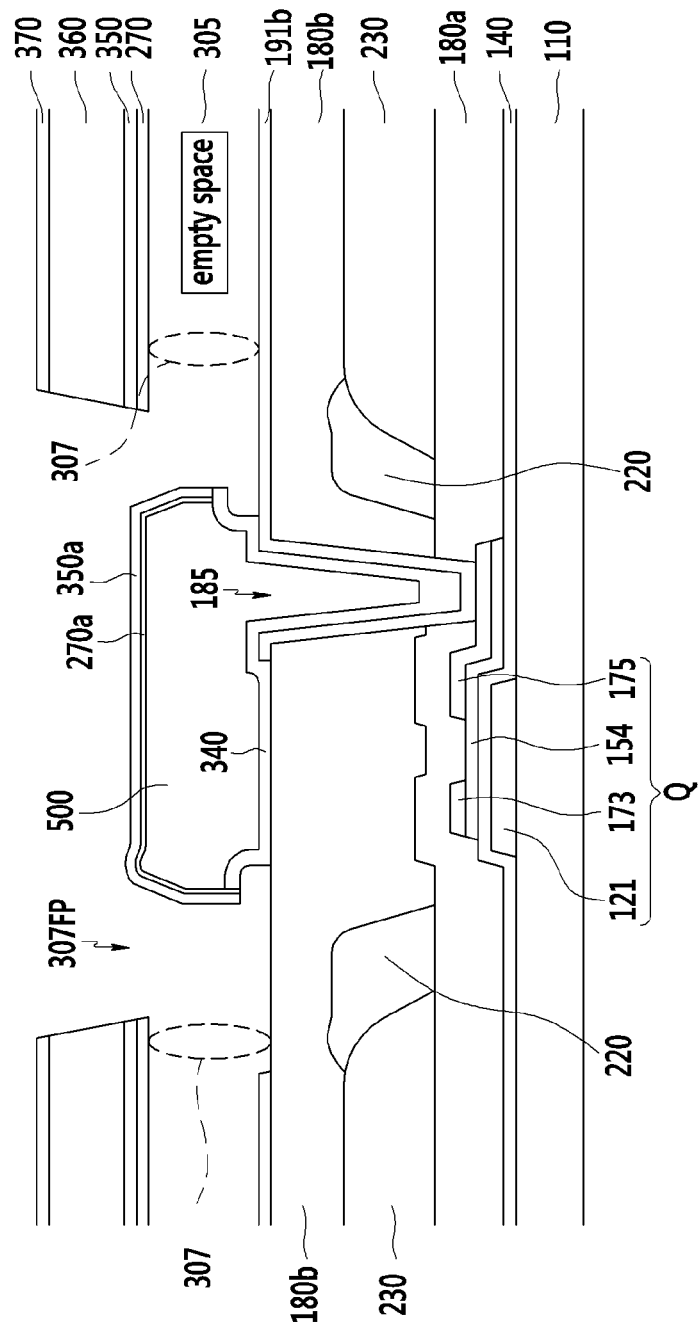

Referring to FIG. 1 and FIG. 8, the sacrificial layer 300 is removed through the liquid crystal injection hole formation region 307FP by an oxygen (O2) ashing process, a wet etching method and the like. At this time, the microcavity 305 having the liquid crystal injection hole 307 which exposes an inside of the microcavity 305, is formed. The microcavity 305 is a space defined in an area where the sacrificial layer 300 is removed. The liquid crystal injection hole 307 may be formed lengthwise extending according to the direction that the gate line 121 extends.

Next, the oxygen (O2) ashing process is performed. This is to prevent abnormal operation of the device since alignment of the liquid crystal is interfered with when the sacrificial layer 300 is not completely removed and some remains. When the sacrificial layer 300 and the light blocking layer 500 are both formed of the organic material, the light blocking layer 500 may be damaged in the process of removing the sacrificial layer 300. Accordingly, when the light blocking layer 500 is damaged, the light blocking layer 500 may not cover the thin film transistor Q and the contact hole 185 such that reliability of the device may be decreased. However, in the illustrated exemplary embodiment, the first passivation layer 340 and the second passivation layer 350a enclose the light blocking layer 500 such that the damage to the light blocking layer 500 is reduced or effectively prevented in the process of removing the sacrificial layer 300.

Next, an alignment material is injected through the liquid crystal injection hole 307 to form alignment layers 11 and 21 on the pixel electrode 191 and the common electrode 270, respectively. The alignment material may include a solid and a solvent. A bake process is performed after injecting the alignment material including the solid and the solvent through the liquid crystal injection hole 307.

Next, a liquid crystal material including liquid crystal molecules 310 is injected into the microcavity 305 through the liquid crystal injection hole 307 such as by using an Inkjet method, thereby forming the structure as in FIG. 2.

Figure 9A:
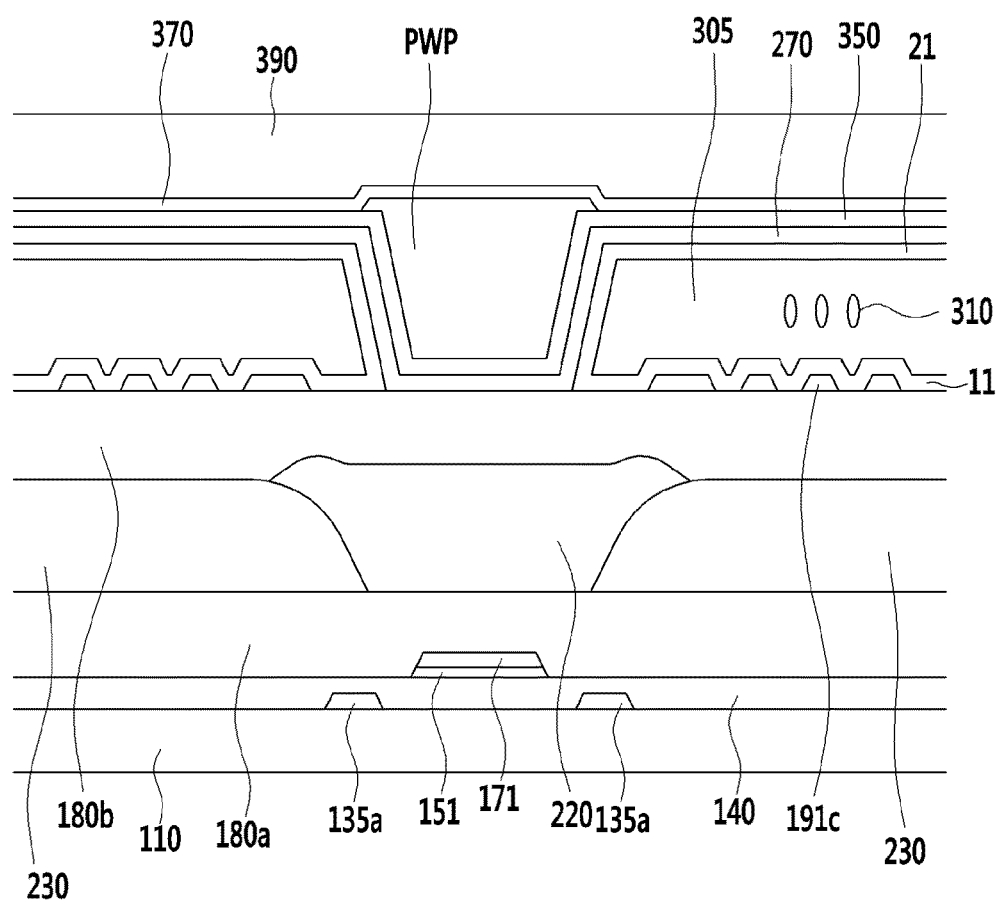
FIG. 9A and FIG. 9B are cross-sectional views of another exemplary embodiment of a liquid crystal display taken along the lines III-III and II-II of FIG. 1, respectively, according to the invention.
Figure 9B:
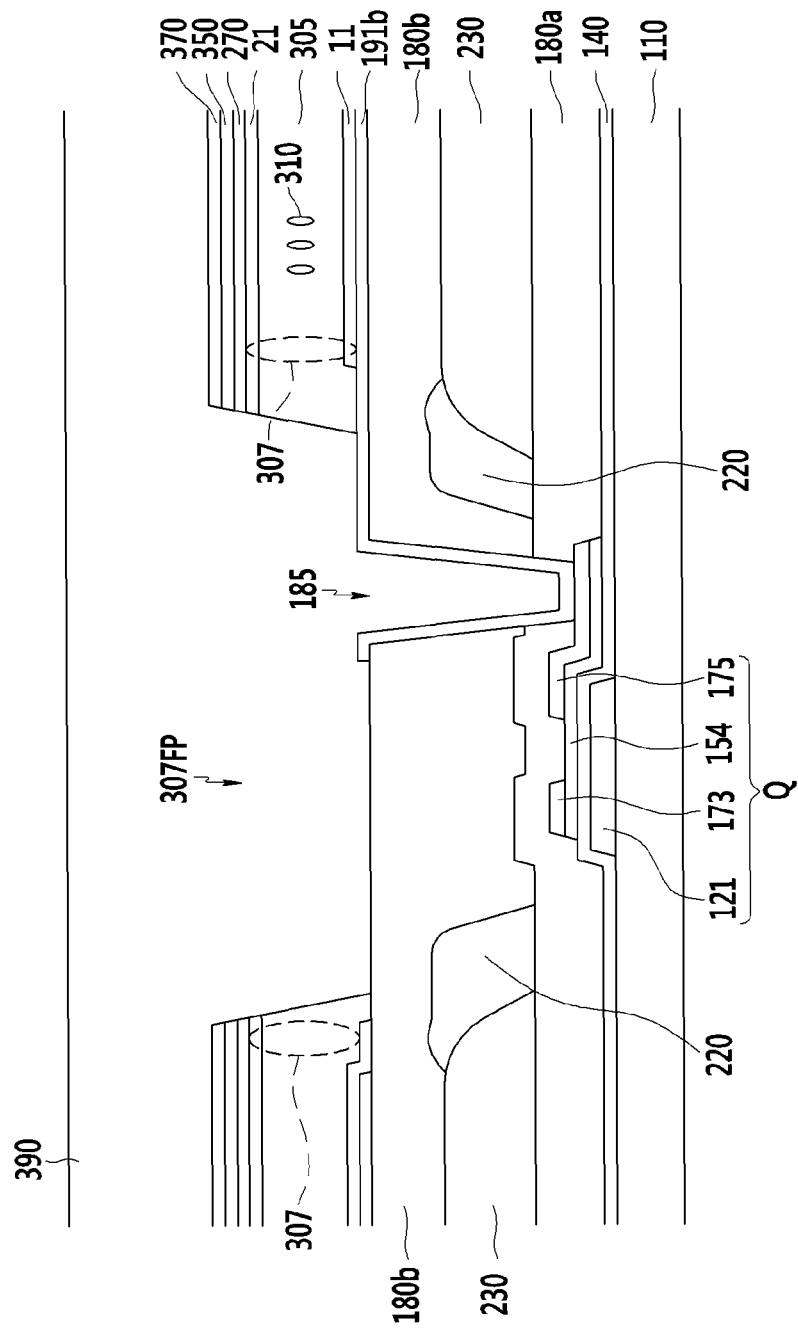

FIG. 9A and FIG. 9B are cross-sectional views of another exemplary embodiment of a liquid crystal display taken along lines III-III and II-II of FIG. 1 according to the invention.

Referring to FIG. 1, FIG. 9A and FIG. 9B, a structure from the substrate 110 to the pixel electrode 191 is substantially the same as the exemplary embodiment described in FIG. 1 to FIG. 3. However, different from the exemplary embodiment of FIG. 2, in the illustrated exemplary embodiment, the light blocking member 220 does not expose and may cover a portion corresponding to the thin film transistor Q. Also, unlike the exemplary embodiment of FIG. 2, the first passivation layer 240 and the structure of the light blocking layer 500 is not included in the illustrated exemplary embodiment of FIG. 9A and FIG. 9B. Next, differences from the exemplary embodiment of FIG. 1 to FIG. 3 will be further described.

As shown in FIG. 9A, in the illustrated exemplary embodiment, the partition formation part PWP is disposed between microcavities 305 adjacent in the direction the gate line 121 extends, the common electrode 270 and the lower insulating layer 350 are positioned under the partition formation part PWP, and the upper insulating layer 370 is positioned on and contacting the partition formation part PWP. Particularly, the common electrode 270, the lower insulating layer 350 and the upper insulating layer 370 are sequentially positioned corresponding to the microcavity 305, and the lower insulating layer 350 and the upper insulating layer 370 contact each other.

As shown in FIG. 9B, in the illustrated exemplary embodiment, the capping layer 390 covers the liquid crystal injection hole 307 while filling the liquid crystal injection hole formation region 307FP. As mentioned above, unlike the exemplary embodiment of FIG. 2, the structure of the light blocking layer 500 is not included in the illustrated exemplary embodiment of FIG. 9A and FIG. 9B In the illustrated exemplary embodiment, different from the exemplary embodiment of FIG. 1 to FIG. 3, there is no constituent element corresponding to the roof layer 360 and the partition formation part PWP is lengthwise extended according to the direction of the data line 171 to support the microcavity 305.

Next, an exemplary embodiment of manufacturing the above-described liquid crystal display will be described with reference to FIG. 10 to FIG. 14B. FIG. 10 to FIG. 14B are cross-sectional views explaining another exemplary embodiment of a manufacturing method of a liquid crystal display taken along line III-III of FIG. 1 according to the invention.

Figure 10:
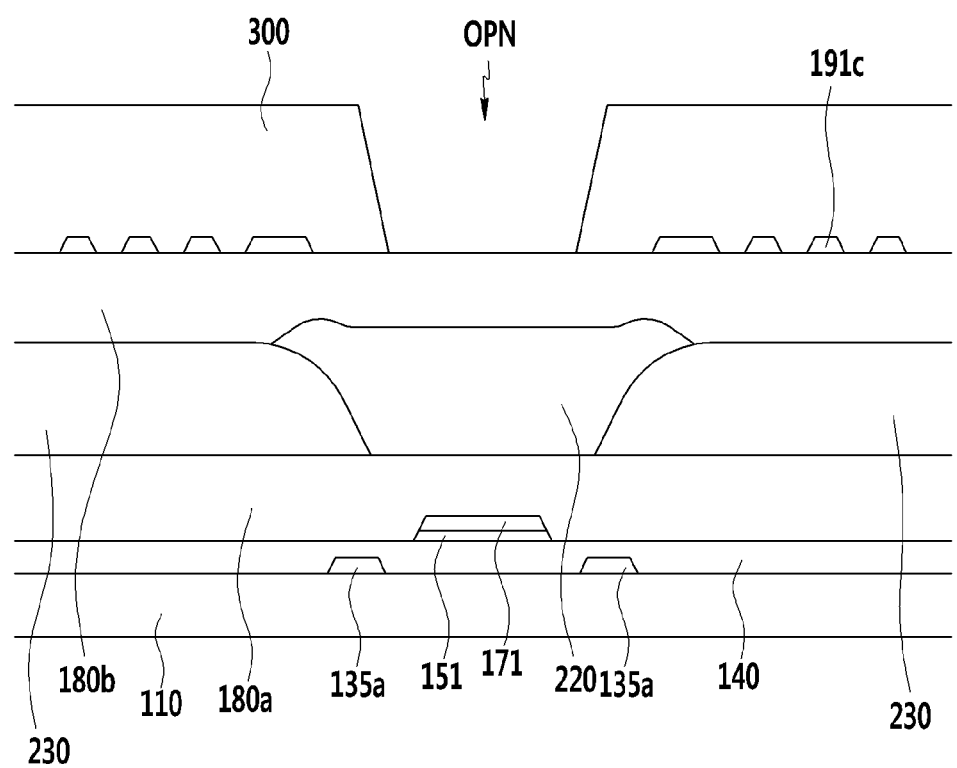
FIG. 10 to FIG. 14B are cross-sectional views explaining another exemplary embodiment of a manufacturing method of a liquid crystal display according to the invention.

Referring to FIG. 1 and FIG. 10, to form a switching element (e.g., a thin film transistor) that is generally known on a substrate 110, a gate line 121 lengthwise extending in the horizontal direction, a gate insulating layer 140 on the gate line 121, semiconductor layers 151 and 154 on the gate insulating layer 140, and a source electrode 173 and a drain electrode 175 are formed. A data line 171 connected to the source electrode 173 may be formed to be lengthwise extended in the vertical direction while intersecting the gate line 121.

The first interlayer insulating layer 180a is formed on the data conductor including the source electrode 173, the drain electrode 175 and the data line 171 and on the exposed semiconductor layer 154.

A color filter 230 is formed on the first interlayer insulating layer 180a at the position corresponding to a pixel area, and a light blocking member 220 is formed between the color filters 230.

The second interlayer insulating layer 180b is formed on the color filter 230 and the light blocking member 220 while covering the color filter 230 and the light blocking member 220, a pixel electrode 191 is formed thereon, and a sacrificial layer 300 is formed on the pixel electrode 191. An open portion OPN is defined between the sacrificial layers 300 adjacent in the direction of the gate line 121. The open portion OPN is formed lengthwise extending according to the direction of the data line 171.

Figure 11:
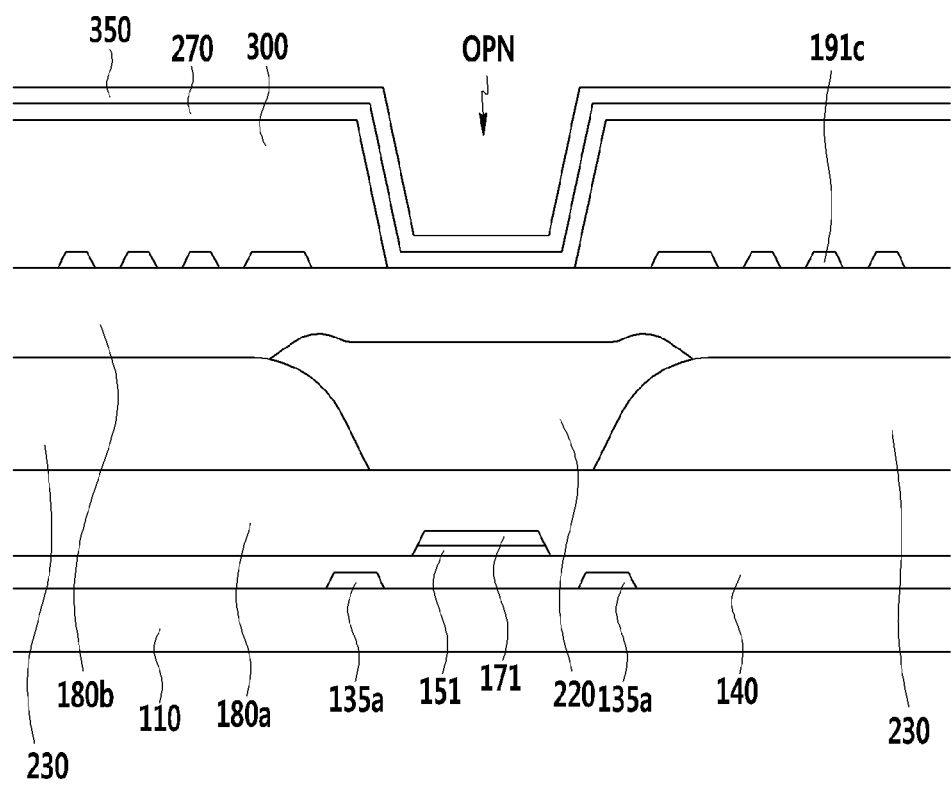

Referring to FIG. 11, a common electrode 270 and the lower insulating layer 350 are sequentially formed on the sacrificial layer 300 and in the open portion OPN.

Figure 12:
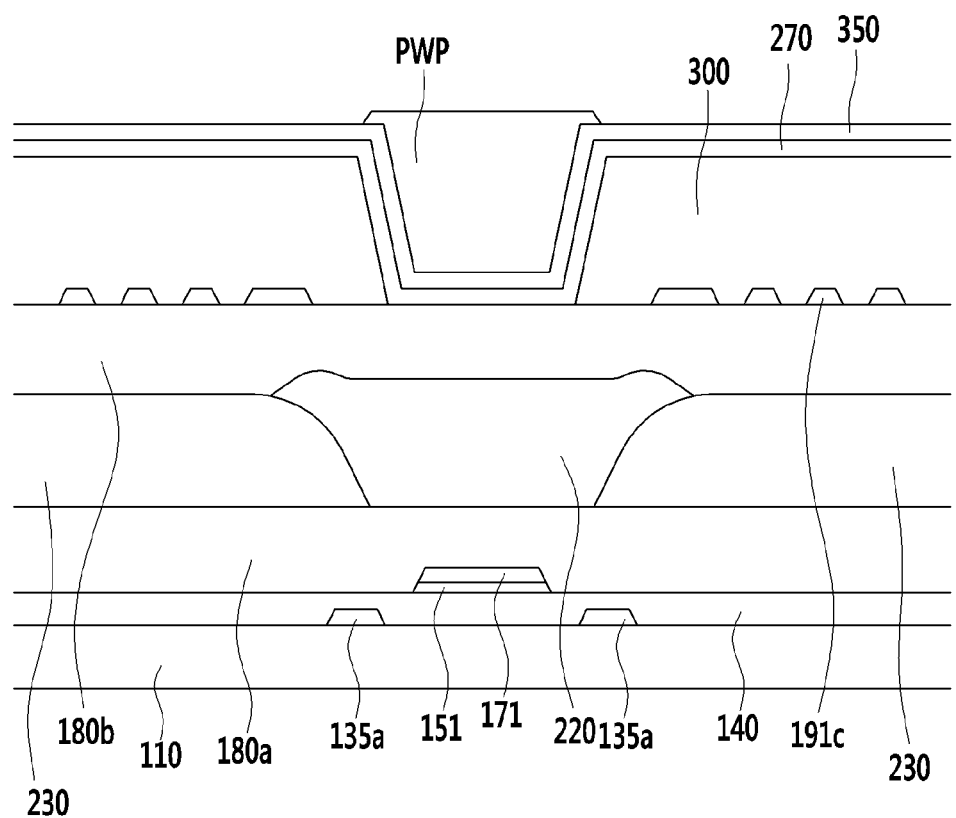

Referring to FIG. 12, a partition formation part PWP filling a remainder of the open portion OPN having the common electrode 270 and the lower insulating layer 350, is formed. The partition formation part PWP may be elongated according to an extension direction of the data line 171, and has the function of supporting the space formed after the sacrificial layer 300 is removed.

Figure 13:
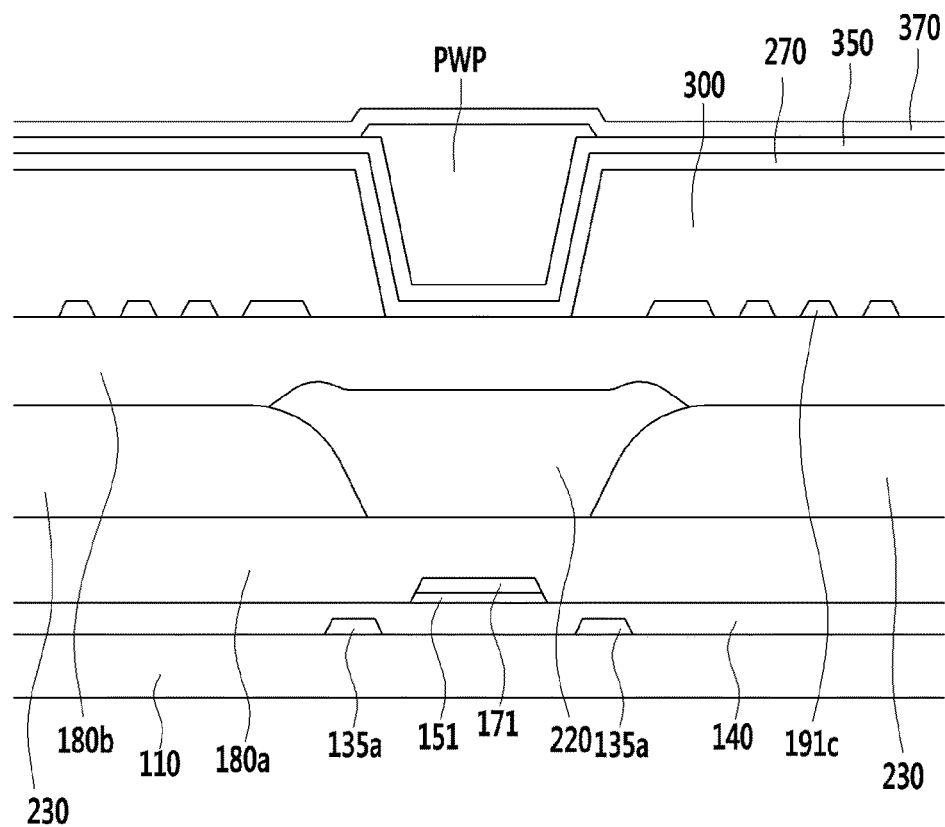

Referring to FIG. 13, the upper insulating layer 370 is formed on the lower insulating layer 350 and the partition formation part PWP. At this time, the upper insulating layer 370 is formed directly on the lower insulating layer 350 in the portion corresponding to the region where the sacrificial layer 300 is formed, and the upper insulating layer 370 is formed on the partition formation part PWP in the region between the sacrificial layers 300 adjacent in the extension direction of the gate line 121.

Figure 14A:
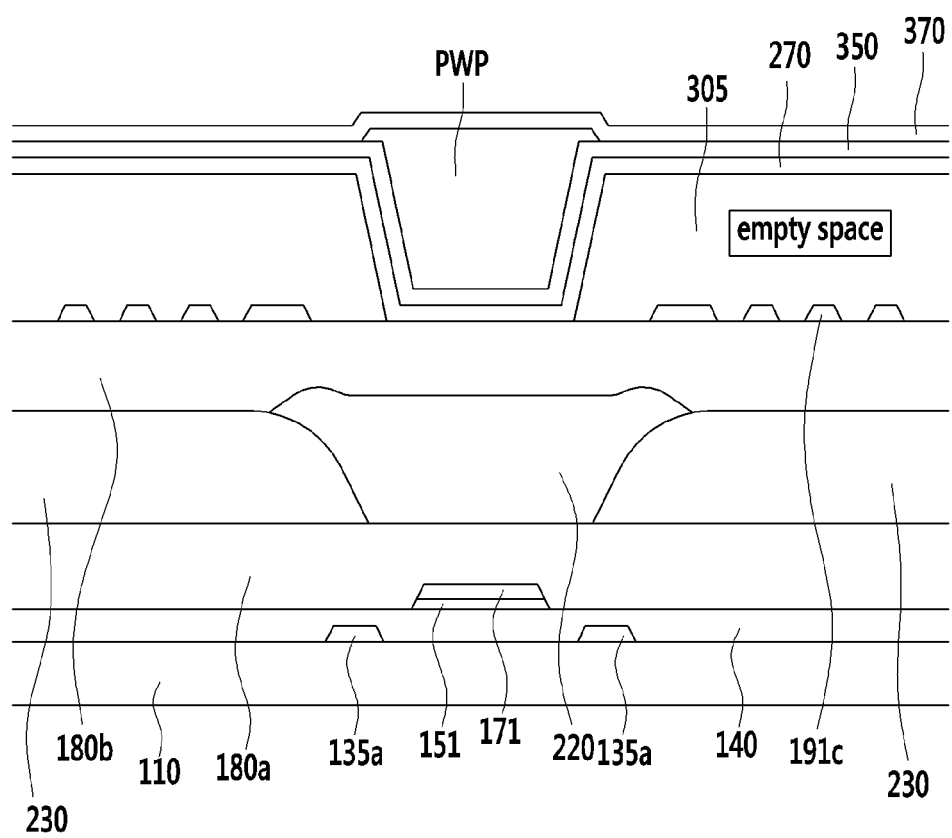
Figure 14B:
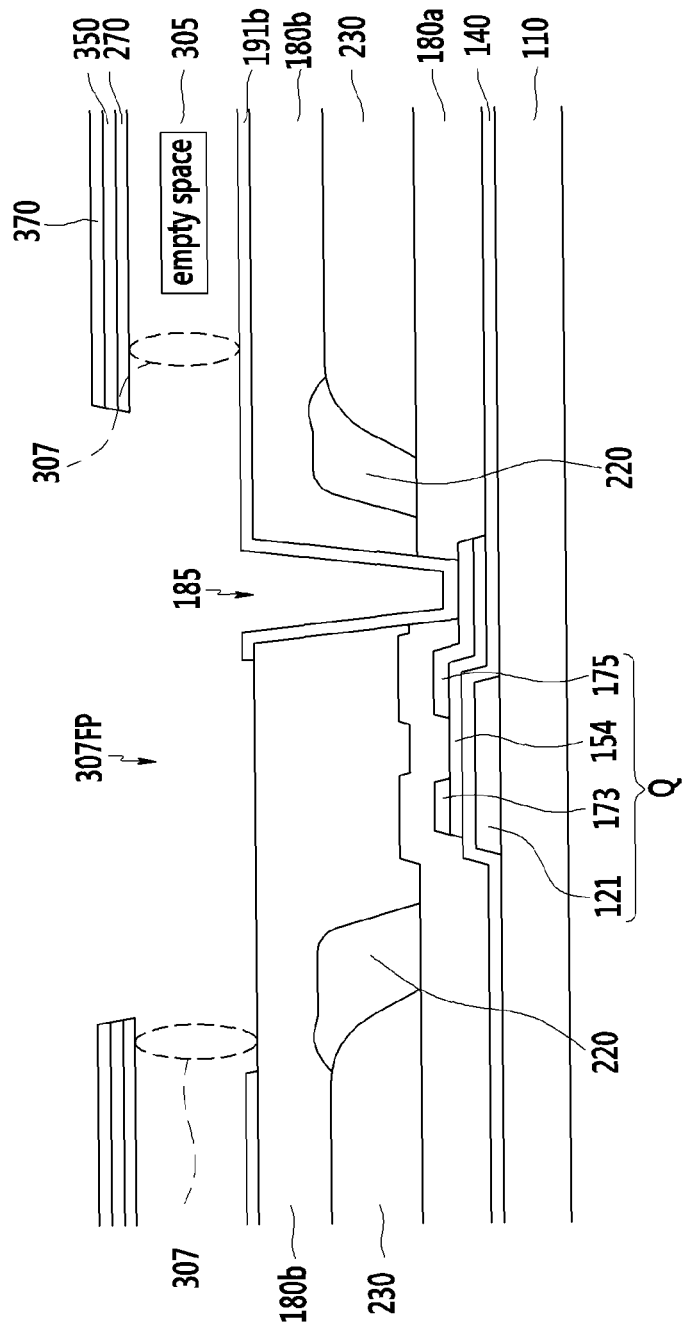

FIG. 14B is a cross-sectional view taken along the line II-II of FIG. 1, to describe the structure described in FIG. 14A.

Referring to FIG. 14A and FIG. 14B, the upper insulating layer 370, the lower insulating layer 350 and the common electrode 270 that are positioned at the portion corresponding to the liquid crystal injection hole formation region 307FP are sequentially patterned and portions thereof removed to expose the sacrificial layer 300. The sacrificial layer 300 is removed through the liquid crystal injection hole formation region 307FP by the oxygen (O2) ashing process or the wet etching. A microcavity 305 having the liquid crystal injection hole 307 exposing an inside thereof is defined. The microcavity 305 is the empty space from which the sacrificial layer 300 is removed.

In the illustrated exemplary embodiment, when forming the liquid crystal injection hole formation region 307FP, the removal sequence of the upper insulating layer 370, the lower insulating layer 350 and the common electrode 270 may be varied according to the process object and the material.

Figure 15:
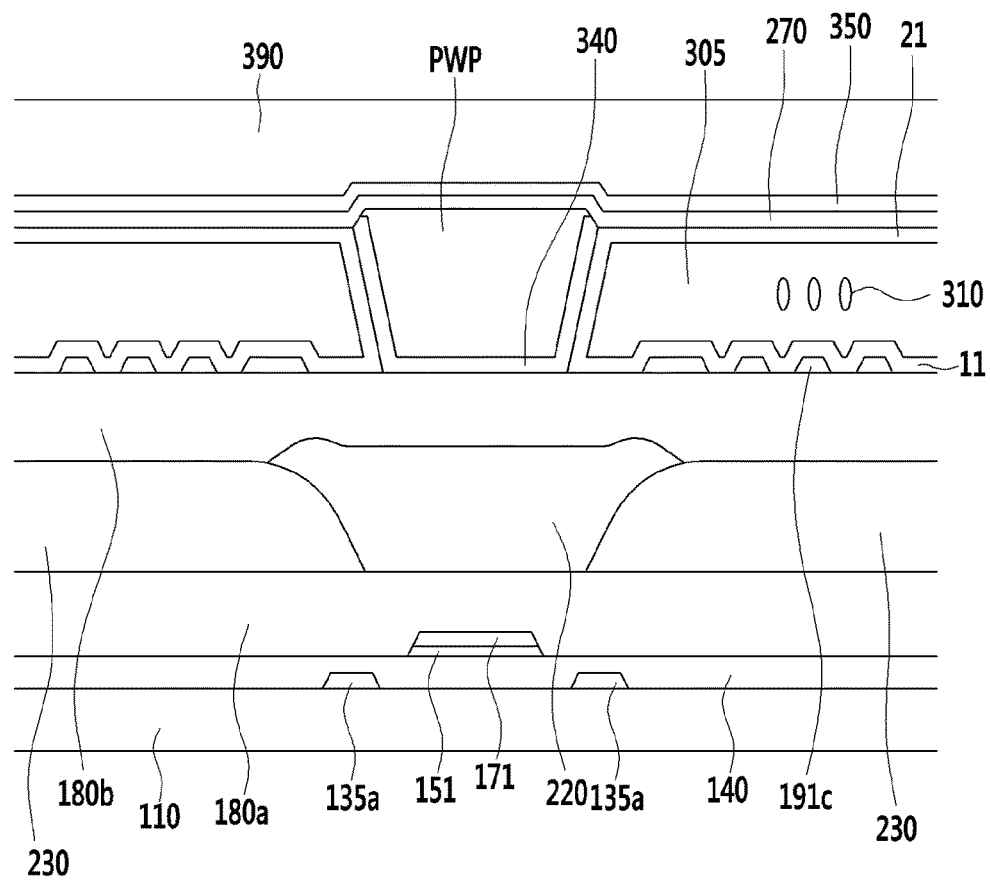
FIG. 15 is a cross-sectional view of still another exemplary embodiment of a liquid crystal display according to the invention.

FIG. 15 is a cross-sectional view of still another exemplary embodiment of a liquid crystal display according to the invention.

In the exemplary embodiment described in FIG. 15, there is no element corresponding to the roof layer, different from the general NCD liquid crystal display like the exemplary embodiment described in FIG. 9. However, different from the exemplary embodiment described in FIG. 9, and similar to the exemplary embodiment described in FIG. 3, the first passivation layer 340 is formed under and at the sides of the partition formation part PWP, and the common electrode 270 and the lower insulating layer 350 cover the partition formation part PWP.

In addition to the described differences, the contents described with reference to FIG. 9 may all be applied to the exemplary embodiment of FIG. 15.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A liquid crystal display comprising:
a substrate;
a pixel electrode on the substrate;

a first insulating layer facing the pixel electrode;

a plurality of microcavities each defined between the pixel electrode and the first insulating layer and comprising a liquid crystal injection hole at which an inside of the microcavity is exposed to outside thereof;

a thin film transistor between adjacent microcavities;

an interlayer insulating layer on the thin film transistor, and a contact hole defined in the interlayer insulating layer;

a liquid crystal layer comprising liquid crystal molecules, in the microcavities;

a light blocking layer which overlaps the thin film transistor between the adjacent microcavities to be spaced apart from the adjacent microcavities; and a passivation layer member enclosing an upper surface and a side surface of the light blocking layer which overlaps the thin film transistor to dispose the passivation layer member spaced apart from the adjacent microcavities, wherein the thin film transistor and the pixel electrode are connected to each other through the contact hole, and the light blocking layer covers the thin film transistor and fills the contact hole.

2. The liquid crystal display of claim 1, wherein the passivation layer member comprises:

a first passivation layer between the pixel electrode and the light blocking layer, and a second passivation layer on the light blocking layer and in a different layer than the first passivation layer.

3. The liquid crystal display of claim 2, wherein the first insulating layer is in a same layer as the second passivation layer.

4. The liquid crystal display of claim 1, further comprising a light blocking member between the thin film transistor and the interlayer insulating layer, and an opening defined in the light blocking member and exposing the thin film transistor.

5. The liquid crystal display of claim 2, wherein the passivation layer member comprises silicon nitride.

6. The liquid crystal display of claim 1, further comprising a gate line extending in a first direction, wherein the thin film transistor is connected to the gate line, and the light blocking layer extends in the first direction and is between the microcavities adjacent to each other in a second direction crossing the first direction.

7. The liquid crystal display of claim 1, further comprising a common electrode between the plurality of microcavities and the first insulating layer.

8. The liquid crystal display of claim 7, wherein the passivation layer member comprises:

a first passivation layer between the pixel electrode and the light blocking layer, and a second passivation layer on the light blocking layer and in a different layer than the first passivation layer, and a patterned portion of the common electrode and a patterned portion of the second passivation layer are on the light blocking layer and separated from the adjacent microcavities.

9. The liquid crystal display of claim 8, further comprising a roof layer on the first insulating layer and comprising an organic material.

10. The liquid crystal display of claim 1, further comprising a partition formation part between the adjacent microcavities and comprising a same material as the light blocking layer.

11. The liquid crystal display of claim 10, further comprising a data line extending in a second direction, wherein the thin film transistor is connected to the data line, and the partition formation part extends in the second direction and is between the microcavities adjacent to each other in a first direction crossing the second direction.

12. The liquid crystal display of claim 11, further comprising a common electrode between the plurality of microcavities and the first insulating layer, and the common electrode and the first insulating layer are on the partition formation part.

* * * * *